United States Patent [19]
Sherman

[11] Patent Number: 6,094,797
[45] Date of Patent: Aug. 1, 2000

[54] APPARATUS AND METHOD FOR INSTALLING A STARTER-GENERATOR ON AN AIRCRAFT ENGINE

[75] Inventor: Seymour Sherman, Dix Hills, N.Y.

[73] Assignee: Aircraft Parts Corporation, Farmingdale, N.Y.

[21] Appl. No.: 08/048,969

[22] Filed: Apr. 16, 1993

Related U.S. Application Data

[62] Division of application No. 07/852,060, Mar. 16, 1992, abandoned.

[51] Int. Cl.[7] ............................. B21D 39/00; F16M 11/00
[52] U.S. Cl. ................................. 29/464; 29/466; 29/468; 29/469; 248/222.52
[58] Field of Search ............................... 403/348, DIG. 4, 403/305, 349; 248/222.52; 29/240, 466, 888.02, 464, 468, 469

[56] References Cited

U.S. PATENT DOCUMENTS

| | | | |
|---|---|---|---|
| 2,645,438 | 7/1953 | Kalikow | 248/672 |
| 4,372,517 | 2/1983 | Welch et al. | 248/222.52 X |
| 4,773,788 | 9/1988 | Ruhl | 403/348 X |

*Primary Examiner*—Joseph M. Gorski
*Attorney, Agent, or Firm*—Charles I. Brodsky

[57] ABSTRACT

Apparatus for installing a starter-generator on an aircraft engine includes a key device for coupling the starter-generator to the engine in coaxial relation and uncoupling the starter-generator from the engine.

3 Claims, 2 Drawing Sheets

APPARATUS AND METHOD FOR INSTALLING A STARTER-GENERATOR ON AN AIRCRAFT ENGINE

This is a divisional application of copending application Ser. No. 07/852,060, filed Mar. 16, 1992 for Apparatus and Method for Installing a Starter-Generator on an Aircraft Engine.

BACKGROUND OF THE INVENTION

The present invention relates to apparatus and a method for installing a starter-generator on an aircraft engine.

Starter-generators installed on aircraft engines weigh from 30 to 50 lbs. and are usually installed by one aircraft mechanic. Often, the generator installation has to be made under an engine, while the mechanic is in a crouching position. At other times, the installation is made 10 to 12 feet above the ground, while the mechanic is standing on a workstand. Handling a 30 to 50 lb. starter-generator then becomes hazardous to the mechanic and costly if the starter-generator, which costs $4,000 to $10,000, is dropped.

The main problem is the design of the parts that are used to attach the starter-generator to the engine. From the 1940's to the 1960's, units like a starter-generator were bolted directly to the engine. The engine mounting pad had threaded studs. The starter-generator had holes in its mounting pad, which accommodated the studs and was secured by nuts coupled or screwed onto the studs.

It is very difficult to work on or provide maintenance services for most aircraft, since there is very little room between components mounted on the engine. In many cases, the mechanic cannot see, but must feel, where the nuts are to be mounted on the studs. In these cases, getting a wrench on to the nuts is almost impossible.

The aircraft manufacturers, aircraft operators, the Army, Air Force and Navy have requested an easier way to install the aforedescribed heavy starter-generators. Based on existing AN standards and MS drawings, the housing of the invention was developed that is permanently bolted to the engine drive pad. The generator is also permanently equipped with a special housing on the drive end. The engine mounted housing is called a Quick Attach-Detach, or QAD housing.

In mounting the starter-generator with the special housing, said starter-generator is inserted into the housing that was mounted on the engine. A round circular V clamp is inserted around both housings and clamps these housings tightly together, by a mechanical clamp latch. A bolt and nut on the clamp latch is tightened to pull the clamp tight around the generator and thereby locks the latch. In order to change this starter-generator, the mechanic must remove the clamp and remove the generator from the engine QAD housing.

The interface between the starter-generator mounting housing and the engine housing has a very short length of engagement. This dimension is 0.370 in. The length of engagement is purposely made short in order to make insertion of the generator into the engine QAD housing easy, since the clearance between the diameters of the two housings is 0.004 to 0.007 in., which is relatively tight.

The basic problem that existed heretofore is that, in almost all cases, one mechanic is assigned to install the starter-generator. The installation procedure is as follows:

1. The mechanic puts the loose clamp loosely around the starter-generator.
2. The mechanic inserts the starter-generator into the QAD housing.
3. The clamp must be positioned over the generator drive end housing and the QAD housing. This requires two hands, so the mechanic removes his hands from the starter-generator and leaves said starter-generator hanging in the QAD housing.
4. The clamp must be then latched together. This also requires two hands.

During Steps 3 and 4 of the procedure, the pressure to hold the starter-generator in the QAD housing is lost, since both hands of the mechanic are on the clamp. Thus, the mechanic's hands are not holding the generator firmly in the QAD housing.

5. The mechanic uses a wrench to tighten the nut on the clamp.

Very often, during Steps 4 and 5 of the procedure, the starter-generator partially backs its way out of the QAD housing and hangs partially out of the QAD housing. Thus, the starter-generator is then clamped in that cocked position. MIL-G-6162 of the military specification covering the design of the starter-generator, mandates that the drive shaft of the starter-generator be able to move radially. Most generators can move a maximum of 0.150 in.

The axial alignment of the generator is considerably off, however. Thus, when the starter-generator drive shaft rotates, in effect it is whipping. This whipping sets up a large vibration in the starter-generator, which rotates at 12,000 rpm. This vibration causes the generator carbon brushes at the rear, or anti-drive end, to bounce up and down and eventually break, causing the starter-generator to fail electrically. This vibration also causes the rear bearing to fail, which again results in a massive mechanical failure of the starter-generator.

The results of starter-generator failure could readily be disastrous. If the aircraft has a single engine and the starter-generator fails at night, the battery will go dead in about 15 to 20 minutes. If that happens, it is impossible for the aircraft to land safely and it will most certainly crash. During the day, the situation is somewhat less hazardous, since the aircraft may be able to land on a road. If the aircraft is a twin-engine aircraft, then operating on one generator is also dangerous, since part of the electrical load on the aircraft must be shut down. This is considered an emergency procedure by the Federal Aviation Administration and the aircraft also has to land quickly, before the battery goes dead. If it is a military aircraft, the mission would have to be cancelled.

The principal object of the invention is to provide an apparatus and method for installing a starter-generator on an aircraft engine coaxially and with structural integrity.

An object of the invention is to provide an apparatus and method for installing a starter-generator on an aircraft engine in a manner whereby the starter-generator will not fail due to vibration or mechanical failure.

Another object of the invention is to provide an apparatus and method for installing a starter-generator on an aircraft engine with minimal hazard to the installer.

Still another object of the invention is to provide an apparatus and method for installing a starter-generator on an aircraft engine with little danger of damage to the starter-generator.

Yet another object of the invention is to provide a method for installing a starter-generator on an aircraft engine which leaves the installer's hands free after each step so that he may maintain the coaxial and structural integrity of the coupling of the starter-generator and the engine to each other.

Another object of the invention is to provide apparatus for installing a starter-generator on an aircraft engine with coaxial and structural integrity.

Still another object of the invention is provide apparatus and a method for installing a starter-generator on an aircraft engine with less difficulty than heretofore and with considerably greater efficiency, effectiveness and reliability.

Yet another object of the invention is to provide an apparatus and method for installation of a starter-generator on an aircraft engine by only one person with minimum hazard to the installer.

BRIEF SUMMARY OF THE INVENTION

In accordance with the invention, in apparatus for installing a starter-generator on an aircraft engine, the starter-generator has a drive end mounting housing and the aircraft engine has a quick attach-detach housing. The apparatus comprises coupling means for coupling the starter-generator to the engine housing in substantially coaxial relation and decoupling or uncoupling said starter-generator from said engine housing.

The coupling means comprises engine components mounted on the engine housing and starter-generator components in the generator mounting housing. The engine components and the starter-generator components cooperate with each other to couple the starter-generator to the engine when the starter-generator is rotated in a predetermined direction and to uncouple the starter-generator from the engine when the starter-generator is rotated in the opposite direction.

The engine and starter-generator components cooperate with each other to couple the starter-generator to the engine when the starter-generator is rotated clockwise and to uncouple the starter-generator from the engine when the starter-generator is rotated counterclockwise.

The coupling means comprises at least a pair of spaced pins of equal length extending substantially perpendicularly from the engine housing substantially parallel to the axis of the engine housing. The pins have heads at the free ends thereof of larger diameter than the shanks of the pins and corresponding slots are formed through the generator mounting housing for accommodating the shanks of the pins in a manner whereby the heads of the pins abut the generator mounting housing and thereby couple the starter-generator to the engine in substantially coaxial relation and permit uncoupling of said starter-generator from said engine.

The slots formed in the generator mounting housing are equal in number to the pins and each of the slots is of substantially arcuate configuration of uniform width smaller than the diameters of the heads of the pins and sufficiently larger than the diameters of the shanks of the pins. Each of the slots has a hole at a corresponding end thereof formed through the generator mounting housing and having a diameter larger than the diameters of the heads of the pins.

In accordance with the invention, in apparatus for installing a starter-generator on an aircraft engine, the starter-generator has a drive end and a generator mounting housing on the drive end and the aircraft engine has a quick attach-detach housing. The apparatus comprises key means for coupling the starter-generator to the engine in substantially coaxial relation and uncoupling the starter-generator from the engine.

The key means comprises at least a pair of spaced pins of equal length extending substantially perpendicularly from the engine housing. The pins have heads at the free ends thereof of larger diameter than the shanks of the pins and corresponding slots are formed through the generator mounting housing for accommodating the shanks of the pins in a manner whereby the heads of the pins abut the generator mounting housing and thereby removably couple the starter-generator to the engine in substantially coaxial relation.

The slots formed in the generator mounting housing are equal in number to the pins and each of the slots is of substantially arcuate configuration of uniform width smaller than the diameters of the heads of the pins and sufficiently larger than the diameters of the shanks of the pins. Each of the slots has a hole at a corresponding end thereof formed through the generator mounting housing and having a diameter larger than the diameters of the heads of the pins.

In accordance with the invention, a method of installing a starter-generator on an aircraft engine via a clamp band, comprises the steps of inserting the starter-generator mounting housing into the engine housing and coupling the starter-generator to the engine housing in substantially coaxial relation in a manner whereby the starter-generator is uncoupleable from the engine housing. The clamp band is positioned loosely around the starter-generator. The clamp band is positioned over the drive end of the starter-generator and the engine housing. The clamp band is then latched tightly on the drive end of the starter-generator and the engine housing whereby the starter-generator and the engine are locked to each other in substantially coaxial relation.

The method is completed by a single person using his hands for each step and whose hands are free for the next step after each step while maintaining the coaxial and structural integrity of the coupling of the starter-generator and the engine to each other.

BRIEF DESCRIPTION OF THE DRAWINGS

In order that the invention may be readily carried into effect, it will now be described with reference to the accompanying drawings, wherein.

DETAILED DESCRIPTION OF A PREFERRED EMBODIMENT

Figure 1:
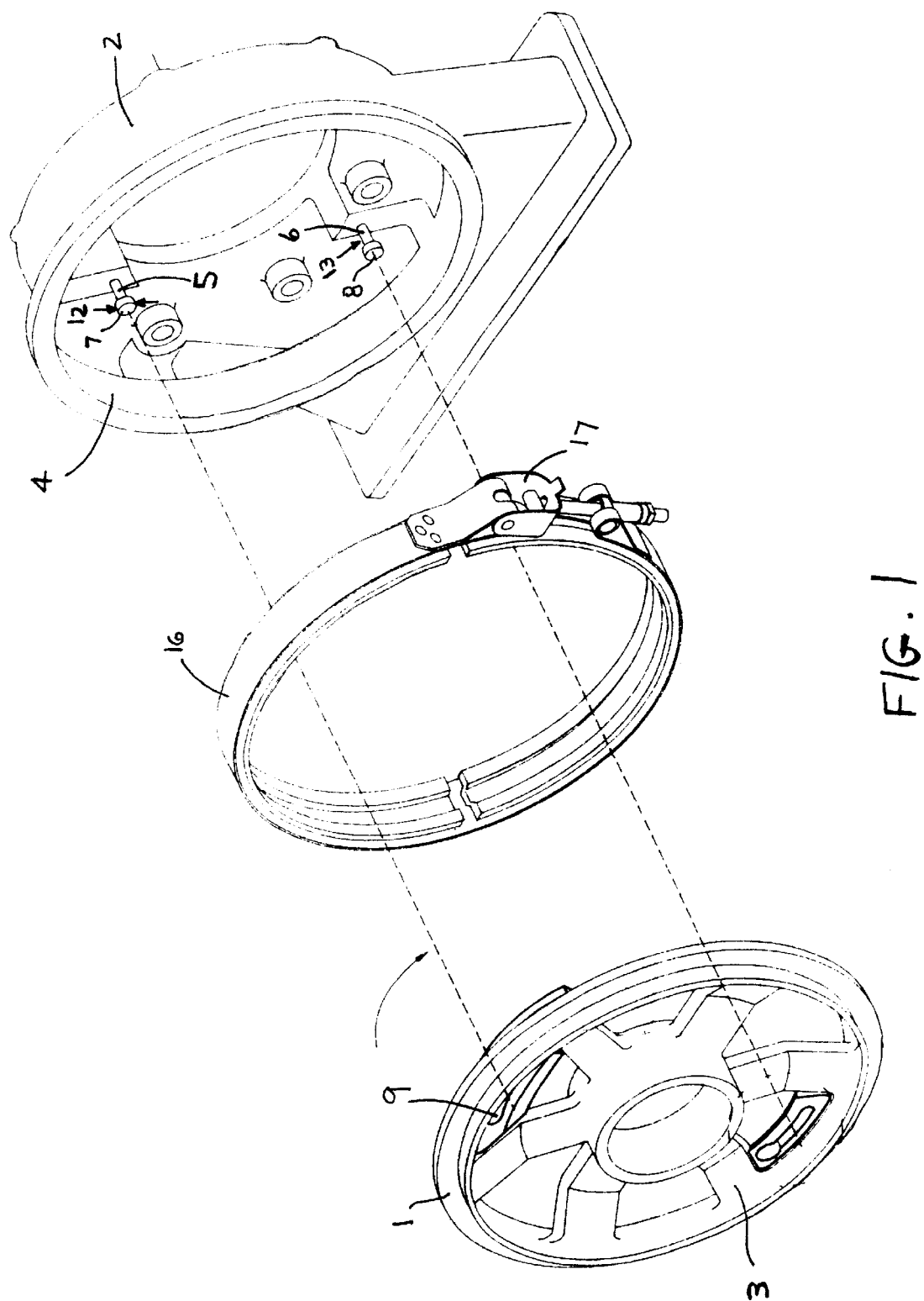
FIG. 1 is an exploded perspective view of an embodiment of the apparatus of the invention for installing a starter-generator on an aircraft engine a nd is illustrative of the method of the invention.

In the different FIGS., the same components are identified by the same reference numerals.

The apparatus of the invention installs a starter-generator 1 (FIGS. 1 and 2) on an aircraft engine 2 (FIG. 1). The starter-generator 1 has a drive end and a generator mounting housing or flange 3 (FIGS. 1 to 3) on said drive end. The aircraft engine 2 has a QAD housing 4 (FIG. 1).

In accordance with the invention, the apparatus of the invention comprises a key device for coupling the starter-generator 1 to the engine 2 in coaxial relation and decoupling or uncoupling said starter-generator from said engine. The key device has at least two spaced pins 5 and 6 (FIG. 1) of equal length extending substantially perpendicularly from the engine QAD housing 4. The pins 5 and 6 have heads 7 and 8, respectively, of larger diameter than that of the shanks of said pins and said heads are at the free ends of said shanks of said pins, as shown in FIG. 1.

Figure 2:
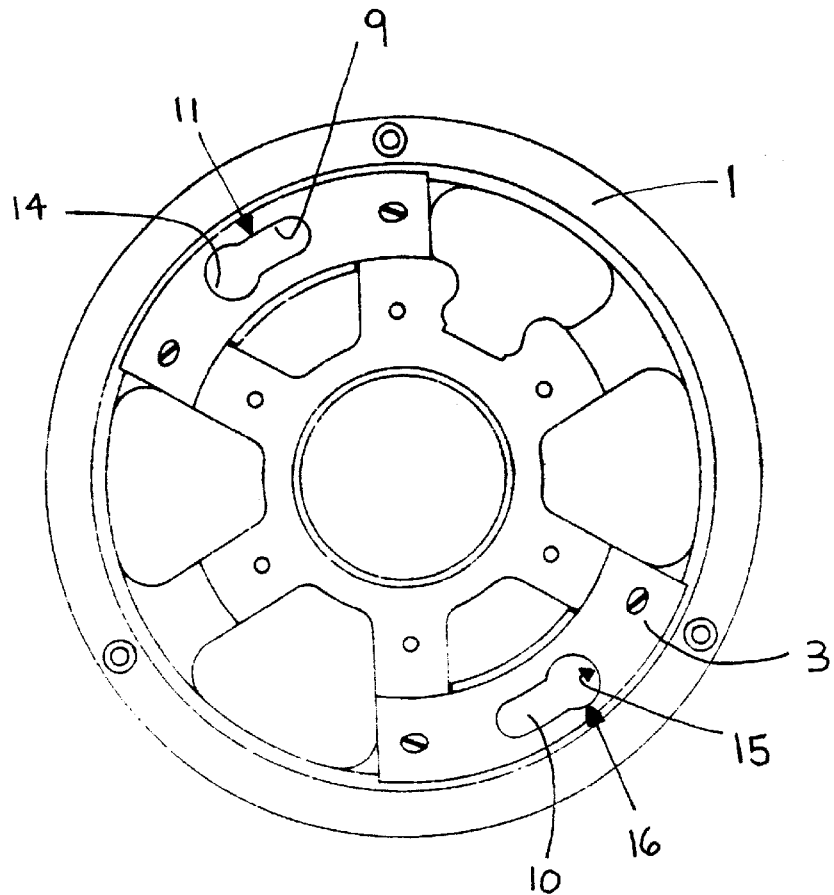
FIG. 2 is an axial view, on an enlarged scale, of the generator mounting housing of FIG. 1.
Figure 3:
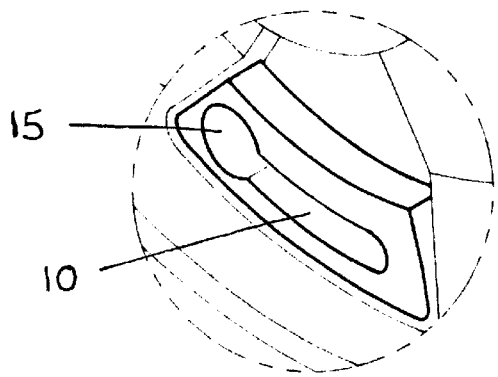
FIG. 3 is a perspective view, on an enlarged scale, of one of the slots formed through the generator mounting housing of FIG. 1.

Slots 9 and 10, corresponding to the pins 5 and 6, respectively, are formed through the generator mounting housing 3, as shown in FIGS. 1 to 3. The slots 9 and 10 accommodate the pins 5 and 6, respectively, in a manner whereby the heads 7 and 8, respectively, of said pins abut the generator mounting housing 3 and thereby removably couple the starter-generator 1 to the engine 2 in coaxial relation. This is accomplished because the slots 9 and 10 formed through the generator mounting housing 3 are equal in number to the pins and each of said slots, as shown in FIGS. 1 to 3, is of arcuate configuration of uniform width 11 (FIGS. 2 and 3) smaller than the diameters 12 (FIG. 1) of the heads of said pins and sufficiently larger than the diameters 13 (FIG. 1) of the shanks of said pins.

Each of the slots 9 and 10 has a hole 14 and 15, respectively, at a corresponding end thereof formed through the generator mounting housing 3 (FIG. 2) and having a diameter 16 (FIG. 2) larger than the diameters 12 of the heads 7 and 8 of the pins 5 and 6, respectively.

In use, the starter-generator 1 is coupled to the engine 2 when said starter-generator and said engine are placed adjacent each other coaxially and said starter-generator is rotated a few degrees such as, for example, 15 to 20 degrees clockwise, after the pins and their heads are passed through the corresponding holes 14 and 15. The starter-generator 1 may be uncoupled from the engine 2 when said starter-generator is rotated counterclockwise until the pins and their heads are in the corresponding holes 14 and 15 and said starter-generator is moved coaxially away from said engine with said holes freeing said starter-generator from said pins.

The directions of rotation for coupling and uncoupling the starter-generator 1 and the engine 2 may be reversed dependent upon at which end of the slots 9 and 10 the holes 14 and 15 are located.

Figure 4:
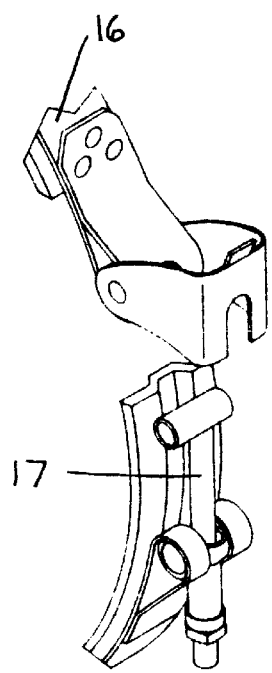
FIG. 4 is a perspective view, o n an enlarged scale, of the latch of the clamp band of FIG. 1.

The method of the invention comprises the steps of inserting the generator mounting housing 3 of the starter-generator 1 into the engine housing and coupling the starter-generator 1 to the QAD housing 4 in coaxial relation in the manner hereinbefore described whereby said starter-generator is uncoupleable from said QAD housing. A clamp band 16 (FIG. 2) is loosely positioned around the starter-generator 1. The installer or mechanic then positions the clamp band 16 over the drive end of the starter-generator 1 and the engine QAD housing 4 and latches said clamp band tightly on said drive end via a latch 17 (FIGS. 1 and 4) and said engine housing whereby said starter-generator and said engine are locked to each other in coaxial relation.

The latch 17 is known, as is the clamp band 16. The latch 17 is shown open in FIG. 4, whereby the clamp band 16 is of greater diameter. The latch 17 is shown closed in FIG. 1, whereby the clamp band 16 is of lesser diameter.

The method of the invention is completed by a single person, using his hands for each step and whose hands are free for the next step after each step. The coaxial and structural integrity of the coupling of the starter-generator 1 and the engine 2 to each other is maintained from the beginning and throughout thereby permitting installation with no danger of said starter-generator falling partially out of the QAD housing 4 and/or cocking. After the first step of the method, the installer or mechanic's hands may be removed from the starter-generator 1 and said starter-generator will remain coupled securely in the QAD housing 4.

Although shown and described in what is believed to be the most practical and preferred embodiment, it is apparent that departures from the specific method and design described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

I claim:

1. A method of installing a starter-generator having a drive end on an aircraft engine, comprising the steps of:

a) mounting a quick attach-detach housing on the aircraft engine;

b) mounting a generator mounting housing on said drive end of said starter-generator, for coupling said starter-generator to said engine in substantially coaxial relation via said quick attach-detach housing and for uncoupling said starter-generator from said engine with structural integrity;

c) coupling said starter-generator to said engine, when desired, by rotating said starter-generator in a predetermined direction to secure said starter-generator to said engine, and uncoupling said starter-generator from said engine, when desired, by rotating said starter-generator in the opposite direction to release said starter-generator from said engine;

d) positioning a clamp band loosely around said starter-generator;

e) positioning said clamp band over said drive end of said starter-generator and over said quick attach-detach housing;

f) latching said clamp band tightly on said drive end of said starter-generator and on said quick attach-detach housing to lock said starter-generator and said aircraft engine to each other in substantially coaxial relation;

where in said third step couples said starter-generator to said engine when said starter-generator is rotated clockwise and uncouples said starter-generator from said engine when said starter-generator is rotated counterclockwise; and further comprising the steps of affixing pins of substantially equal length in spaced relation in said quick attach-detach housing extending therefrom and substantially perpendicular thereto, shaping said pins with heads of a first diameter at the free ends thereof and with shanks of a second smaller diameter, forming slots through said generator mounting housing corresponding in number and position to said pins, with said slots having an arcuate configuration of a uniform width smaller than said first diameter of said heads of said pins and larger than said second diameter of said shanks of said pins, and with said slots each having a hole of diameter larger than said first diameter of said heads of said pins, placing said starter-generator and said generator mounting housing on said quick attach-detach housing in a manner whereby said pins and said heads thereof insert through said holes of said slots and whereby, when said starter-generator is rotated clockwise, said heads of said pins abut said generator mounting housing along said arcuate configuration of said slots and thereby secure said starter-generator to said engine and to couple said starter-generator to said engine in substantially coaxial relation;

whereby said starter-generator is protected against falling due to vibration or mechanical failure.

2. The method of claim 1, further comprising the steps of forming each of said slots arcuate configuration of uniform width smaller than the diameters of said heads of said pins and sufficiently larger than the diameters of said shanks of said pins, providing with said hole at a corresponding end of each slot.

3. The method of claim 1 wherein the step of placing said starter-generator and said generator mounting housing on said quick attach-detach housing is in a manner whereby, when said starter-generator is rotated counter-clockwise, said heads of said pins free from said generator mounting housing along said arcuate configuration of said slots to remove from said holes and thereby release said starter-generator from said engine and to uncouple said starter-generator from said engine.

\* \* \* \* \*